(12) United States Patent
Leon et al.

(10) Patent No.: US 7,163,998 B2
(45) Date of Patent: Jan. 16, 2007

(54) STABILIZED POLYMER BEADS AND METHOD OF PREPARATION

(75) Inventors: Jeffrey W. Leon, Rochester, NY (US); Tiecheng A. Qiao, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/658,009

(22) Filed: Sep. 9, 2003

(65) Prior Publication Data

US 2005/0054815 A1    Mar. 10, 2005

(51) Int. Cl.
C08G 75/00 (2006.01)
C08C 9/00 (2006.01)
C08F 283/00 (2006.01)
C08L 81/00 (2006.01)

(52) U.S. Cl. ............... 528/391; 528/373; 524/504; 524/609; 525/63; 525/330.9; 525/353; 525/535

(58) Field of Classification Search .......... 528/373, 528/391; 524/504, 609; 525/63, 330.9, 525/353, 535
See application file for complete search history.

(56) References Cited

U.S. PATENT DOCUMENTS

| 4,258,001 A | * | 3/1981 | Pierce et al. ............... 422/56 |
| 4,486,530 A | | 12/1984 | David et al. |
| 4,582,810 A | | 4/1986 | Rosenstein |
| 4,997,772 A | | 3/1991 | Sutton et al. |
| 5,374,516 A | | 12/1994 | Sutton et al. |

FOREIGN PATENT DOCUMENTS

| EP | 0 302 715 B1 | | 2/1989 |
| US | EP0430371 | * | 5/1991 |
| WO | 84/03358 | | 8/1984 |

OTHER PUBLICATIONS

Macromolecular Rapid Communications, vol. 15, pp. 909-915 (1994).

* cited by examiner

Primary Examiner—Duc Truong
(74) Attorney, Agent, or Firm—Lynne M. Blank

(57) ABSTRACT

The present invention relates to a polymer particles comprising a polymer bead stabilized by vinylsulfonyl-functionalized polymers grafted to the surface of the bead, as well as a particle composition comprising monodisperse polymer beads stabilized by vinylsulfonyl-functionalized polymers, wherein the vinylsulfonyl-functionalized polymers are grafted to the surfaces of the beads. The invention also includes a method of preparing monodisperse polymer particles comprising preparing a homogeneous solution of an ethylenically unsaturated polymerizable monomer, an initiator, and a polymeric stabilizer, wherein the polymeric stabilizer consists of repetitive units, wherein the repetitive units comprise latent vinylsulfonyl moiety, polymerizing the homogeneous solution, and converting the latent vinylsulfonyl moiety to vinylsulfonyl moieties.

13 Claims, No Drawings

STABILIZED POLYMER BEADS AND METHOD OF PREPARATION

CROSS-REFERENCE TO RELATED APPLICATIONS

Reference is made to commonly assigned, co-pending U.S. patent application Ser. No. 10/658,438 by Leon et al. filed of even date herewith entitled "Biological Microarray Comprising Polymer Particles And Method Of Use", the disclosure of which is incorporated herein.

FIELD OF THE INVENTION

The present invention relates to polymer beads stabilized by vinylsulfonyl-containing polymer and method of preparation.

BACKGROUND OF THE INVENTION

There is a continuous need in medical practice, research and diagnostic procedures for rapid, accurate, quantitative determinations of biological substances, which are present in biological fluids at low concentrations. For example, the presence of drugs, narcotics, hormones, steroids, polypeptides, prostaglandins or infectious organisms in blood, urine, saliva, vaginal secretions, seminal fluids and other biological fluids has to be determined in an accurate and rapid fashion for suitable diagnosis or treatment. In addition, there is an interest in the attachment of biological macromolecules onto polymer particles. Such immobilized biomacromolecules have found applications in medical diagnostics, reaction catalysis, and in protein and deoxyribonucleic acid (DNA) microarrays.

One particular type of diagnostic method is an agglutination test, which is useful for the detection of antigens, which have multiple sites for antibody reactivity. In such a test, anti-body molecules can be bound in a suitable fashion to water-insoluble particles. Antibody-antigen reaction at multiple sites causes the particles to agglutinate and precipitate. Suitable separation and detection means have been devised to make the agglutinate readily observable, including for example, the use of particles containing a tracer material as described in U.S. Pat. No. 4,997,772 and in references cited therein.

Another useful method for detecting biological substances in fluids is what is known in the art as a "sandwich" assay. Such an assay involves "sandwiching" the compound of interest (such as an antigen) with two or more receptor molecules (such as antibodies) which complex with the compound at different and noninterfering sites. Examples of such assays are described, for example, in U.S. Pat. No. 4,486,530. In most sandwich assays, one or more of the receptor molecules are suitably immobilized on an insoluble carrier such as small particles, membranes, plates, test wells or similar objects.

Attachment of antibodies or receptor molecules to insoluble carrier materials has been achieved in the past in a number of ways. Early work relied on adsorption of the molecules, but it was realized that adsorption is generally not a strong method of attachment. Later researchers found that the molecules could be covalently attached by reaction of certain functional groups of the molecules with specially designed reactive groups on the carrier material. For example, proteins have been attached by reacting carboxy groups of particles or supports with an activating compound, which renders the groups reactive with amino groups of a protein. Carbodiimides are examples of useful activating compounds.

Immunological compounds may be immobilized on polymer particles. Although immunological compounds may be directly attached to the particles, direct attachment may deactivate the immunological compounds. Yet, it is desired to strongly attach those compounds to the particles.

Various reagents have been prepared with particles having reactive groups such as epoxides, aldehydes, amino groups and diazonium salts. All of these groups have disadvantages. Epoxide groups are not stable, so that the particles cannot be stored for very long. Particles having aldehyde groups generally tend to agglutinate prematurely. The aldehyde groups also prematurely oxidize, thereby losing binding activity. Particles with amine groups, like carboxylated materials, require an additional activation step for attachment. Diazonium compounds are unstable and therefore undesirable to work with. EP 320715 and U.S. Pat. No. 5,374,516 disclose latex particles, which contain repetitive vinylsulfonyl units. These units, however, are bound directly to the particle surface. Furthermore, they are of a size range, which is too small for use in assays, which require optical imaging.

U.S. Pat. No. 4,582,810 and PCT Publication 84/03358 describe the attachment of avidin to latex particles having free carboxyl groups on their surfaces. As described therein, the conventional procedure for covalently attaching avidin to the particles involves the use of a water-soluble carbodiimide in an activation step. While producing reagents, this procedure tends to activate the exposed reactive groups of the protein avidin as well as the carboxyl groups on the particles. The result is intramolecular and intermolecular crosslinking or polymerization of avidin, and a significant portion of the reagent is impaired from complexation with biotin. In addition, there may be premature agglutination of the insolubilized reagent due to the cross-reactivity of the activating compound. These problems present a serious economic loss as well as an impairment of diagnostic sensitivity. It has also been evident that carbodiimides provide a reactive intermediate for avidin attachment, which is unstable and must be used immediately. The reactive units of the carboxylic acid particles are bound directly to the particle surface, which can limit the accessibility of biomacromolecules immobilized therein.

Macromolecular Rapid Communications Vol. 15 p. 909–915 (1994) reports the immobilization of enzymes to soluble stabilizer polymer arms protruding from the surface of a polymer particle. Enhancements in accessibility of the enzyme to target substrates are observed over enzymes covalently bound directly to the particle surface. However, the enzyme was reversibly adsorbed to the stabilizer arms and was not covalently bound. In addition, the stabilizer arms contained only carboxylic acids as their reactive functionality, so if covalent attachment was desired, it would require the use of a coupling agent and a subsequent preparative step.

Hence, reagents, which are covalently attached to a water-insoluble particle, would be very useful in diagnostic methods. It would also be desirable to have reagents for immobilizing immunological species without directly attaching the species to the insoluble carrier material, while achieving an attachment that is stronger than that achieved through mere adsorption. It would also be advantageous if the immobilization could be afforded without the addition of further chemical reagents.

PROBLEM TO BE SOLVED

There remains a need for polymer microspheres, useful in a biological assay which allow a biological capture agent, also referred to as a tag or bioaffinity tag, to be easily attached to the surface of such microspheres without using any chemical coupling agents and which allow the tag to retain higher reactivity than the same compounds bound directly to the surface of a similar bead.

SUMMARY OF THE INVENTION

The present invention relates to a polymer particle comprising a polymer bead stabilized by vinylsulfonyl-functionalized polymers grafted to the surface of the bead. The present invention also relates to a method of preparing monodisperse polymer particles comprising preparing a homogeneous solution of at least one ethylenically unsaturated polymerizable monomer, an initiator, and a polymeric stabilizer, wherein the polymeric stabilizer consists of repetitive units, wherein the repetitive units comprise at least one latent vinylsulfonyl moiety, polymerizing the homogeneous solution, and converting the at least one latent vinylsulfonyl moiety to vinylsulfonyl moieties

ADVANTAGEOUS EFFECT OF THE INVENTION

The present invention includes several advantages, not all of which are incorporated in a single embodiment. Biological macromolecules immobilized on these particles via the soluble stabilizer polymer grafts will retain higher reactivity than the same compounds bound directly to the surface of a similar bead. As such, no coupling reagents are needed for the attachment of biological molecules, which greatly simplifies the process of attaching a biological molecule to the micropheres. These polymer particles may show promise for use in biological microarrays due to the very high density of vinylsulfonyl moieties on their surface, their high monodispersity, and the ability to produce larger sized beads.

DETAILED DESCRIPTION OF THE INVENTION

This invention pertains to polymer particles, which are stabilized by vinylsulfonyl-functionalized polymers grafted to the particle surface. The particles of the present invention contain vinylsulfonyl units, which are part of the particle stabilizer, and hence, allow for attachment of biological macromolecules in a less deactivating manner. The particles may be highly monodisperse and may be useful for such biological applications as immobilized biocatalyst reagents, agglutination assays, and protein and nucleic acid microarrays.

These polymer particles will have a mean diameter of between 0.2 and 100 microns. Preferably, the mean diameter will be between 0.5 and 20 microns. Most preferably, the mean diameter will be between 2 and 10 microns. Preferably these polymer particles will be monodisperse or relatively monodisperse. By "monodisperse" it is meant that the coefficient of variation of the particle size distribution, that is, the standard deviation as a percentage of the mean, will be less than 20%. Preferably, the coefficient of variation will be less than 15%. Most preferably, the coefficient of variation will be less than 10%.

The particular polymer, which comprises the beads, is a water insoluble synthetic polymer. Preferably the polymer of the bead will be an addition polymer of monomers containing $\alpha,\beta$-ethylenic unsaturation. Useful monomers may include, but are not limited to, methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, $\alpha$-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ether, allyl alcohol and its ethers and esters, and unsaturated ketones and aldehydes such as acrolein and methyl vinyl ketone, isoprene, butadiene and acrylonitrile. Preferably, the monomers will be styrenics, acrylic esters, methacrylic esters, acrylamides, methacrylamides, or vinyl esters.

In addition, small amounts, typically less than 10% of the total weight of the polymerizeable solids, of one or more water-soluble ethylenically unsaturated monomers may be used. Such monomers include but are not necessarily limited to styrenics, acrylates, and methacrylates substituted with highly polar groups, unsaturated carbon and heteroatom acids such as acrylic acid, methacrylic acid, fumaric acid, maleic acid, itaconic acid, vinylsulfonic acid, vinylphosphonic acid, and their salts, vinylcarbazole, vinylimidazole, vinylpyrrolidone, and vinylpyridines.

The polymer particles of this invention may further comprise monomers containing at least two ethylenically unsaturated chemical functionalities. These functionalities may be vinyl groups, acrylates, methacrylates, vinyl ethers and vinyl esters. Monomers include, but are not limited to trimethylolpropane triacrylate, ethylene glycol dimethacrylate, isomers of divinylbenzene, and ethylene glycol divinyl ether. These monomers are preferably used as 0–10% of the total weight of the polymer beads. Most preferably they are present as 0–2% of the total weight of the polymer beads.

The beads are stabilized by polymers, which comprise vinylsulfonyl or vinylsulfonyl precursor moieties and are grafted to the bead surface. Herein grafted means covalently bound, chemisorbed, or physically adsorbed to the bead surfaces. The vinylsulfonyl-functionalized polymer is soluble in the solvent in which the beads are prepared, usually water, water-miscible solvents, or a mixture of more than one of the above, and may be linear or branched. The vinylsulfonyl-functionalized polymer serves any of several purposes including affording the polymer particles of this invention adequate dispersibility in a carrier fluid, usually water, allowing for the grafting of biological probes or other desired molecules to the bead, or allowing for the immobilization of the polymer particles of this invention within a matrix or onto a support. The vinylsulfonyl-functionalized polymer may be a homopolymer or a copolymer, which includes random, block, and graft copolymers. The vinylsulfonyl-functionalized polymer may have a molecular weight of from 500–1,000,000 AMU. Preferably, the molecular weight will be between 2000 and 100,000 AMU. Most preferably, the vinylsulfonyl-functionalized polymer will have a molecular weight between 5000 and 50,000 AMU.

The vinylsulfonyl-functionalized polymer used with this invention will contain vinylsulfone groups or vinylsulfone precursor groups. These groups are advantageous because they allow for the attachment of biological probes containing thiol or amine functionalities via a direct reaction at room temperature and require the addition of no other chemical agents. Due to the highly reactive nature of the vinylsulfonyl moiety, the moiety may initially be present as a latent vinylsulfonyl moiety, which is later converted to a vinylsulfone via mild chemical treatment.

Formula I represents a generalized structure for a stabilizer polymer containing vinylsulfonyl groups or vinylsulfonyl precursor polymers.

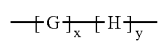

Formula I

Polymers represented by the structure in Formula I, consist of the polymerization products of a "G" monomer, which affords favorable solubility and/or physical properties to the polymer, and an "H" monomer, which contains the vinylsulfone moiety or, more preferably, a vinylsulfone precursor function, such as a sulfonylethyl group with a leaving group in the β-position. x and y both represent molar percentages ranging from 10 to 90 and 90 to 10. Preferably, x and y range from 25 to 75 and 75 to 25, respectively.

G is a polymerized α,β-ethylenically unsaturated addition polymerizeable monomer which imparts desirable solubility properties to the polymer or which allows the polymer particles of this invention to be readily dispersed in a carrier solvent (water in most cases) or readily grafted or immobilized within a matrix or on a solid support. The monomers, from which polymerized G may be derived, include both ionic and nonionic monomers. Ionic monomers may include, for example, anionic ethylenically unsaturated monomers such as 2-phosphatoethyl acrylate potassium salt, 3-phosphatopropyl methacarylate ammonium salt, acrylamide, methacrylamides, maleic acid and salts thereof, sulfopropyl acrylate and methacrylate, acrylic and methacrylic acids and salts thereof, N-vinylpyrrolidone, acrylic and methacrylic esters of alkylphosphonates, styrenics, acrylic and methacrylic monomers containing amine ammonium functionalities, styrenesulfonic acid and salts thereof, acrylic and methacrylic esters of alkylsulfonates, vinylsulfonic acid and salts thereof. Nonionic monomers may include monomers containing hydrophilic, nonionic units such as poly(ethylene oxide) segments, carbohydrates, amines, amides, alcohols, polyols, nitrogen-containing heterocycles, and oligopeptides. Examples include, but are not limited to poly(ethylene oxide)acrylate and methacrylate esters, vinylpyridines, hydroxyethyl acrylate, glycerol acrylate and methacrylate esters, (meth)acrylamide, and N-vinylpyrrolidone.

Preferably, G is the polymerized form of acrylamide, sodium 2-acrylamido-2-methanepropionate, sulfopropyl acrylate and methacrylate salts, or sodium styrenesulfonate.

Monomer H is preferably a vinylsulfone or vinylsulfone precursor unit covalently bound to a polymerizeable α,β-ethylenically unsaturated function by an organic spacer, which consists of Q and L, of which Q is an optional component, as represented by Formula II.

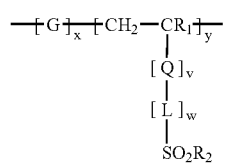

Formula II

Wherein:

$R_1$ is a hydrogen atom or a $C_1$–$C_6$ alkyl group. Preferably $R_1$ is a hydrogen atom.

Q is —$CO_2$—, or $CONR_1$.;

v is 1 or 0;

w is 1–3;

L is a divalent linking group containing at least one linkage selected from the group consisting of —$CO_2$— and —$CONR_1$, and containing 3–15 carbon atoms, or a divalent atom containing at least one linkage selected from the group consisting of —O—, —$N(R_1)$—, —CO—, —SO—, —$SO_2$—, —$SO_3$—, —$SO_2N(R_1)$—, —$N(R_1)CON(R_1)$— and —$N(R_1)CO_2$—, and containing 1–12 carbon atoms in which $R_1$ has the same meaning as defined above;

$R_2$ is —CH=CH2 or —CH2—CH2$X_1$ wherein $X_1$ is a substituent replaceable by a nucleophilic group or releasable in the form of $HX_1$ by a base. $X_1$ may be, but is not necessarily limited to —$S_2O_3^-$, —$SO_4^-$, —Cl, —Br, —I, quaternary ammonium, pyridinium, —CN, and sulfonate esters (such as mesylate and tosylate).

Vinylsulfone and vinylsulfone-containing precursor "H" monomers useful in this embodiment include, but are not necessarily limited to those compounds disclosed in U.S. Pat. Nos. 4,548,869 and 4,161,407 (incorporated herein by reference).

More than one type each of G and H monomers may be present in the same polymer. Additional monomers may be incorporated in order to modify properties such as glass transition temperature, surface properties, and compatibility with other formulation components as needed for specific applications. Selection of additional monomers will be application dependent and will be obvious to one skilled in the art.

As noted above, the polymer particles useful in the practice of this invention may be homogeneously composed of one of the polymers, or a mixture thereof. Alternatively, the polymers may be an outer graft or shell of a grafted copolymer or core-shell particle, respectively. Useful core-shell polymers are described, for example, in U.S. Ser. No. 98,583, noted above now U.S. Pat. No. 4,997,772.

Structures of some specific examples are shown below:

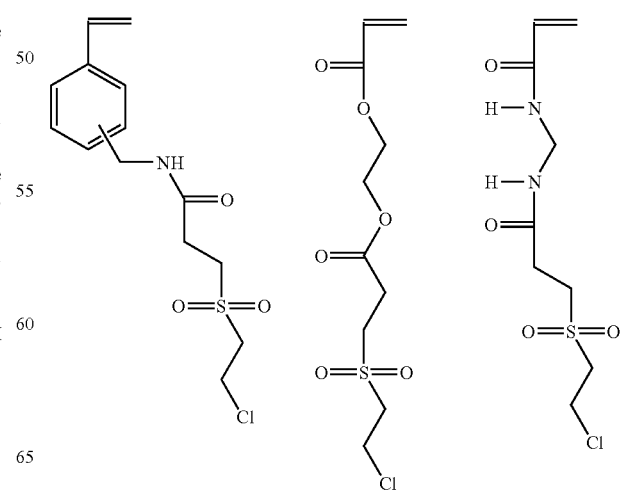

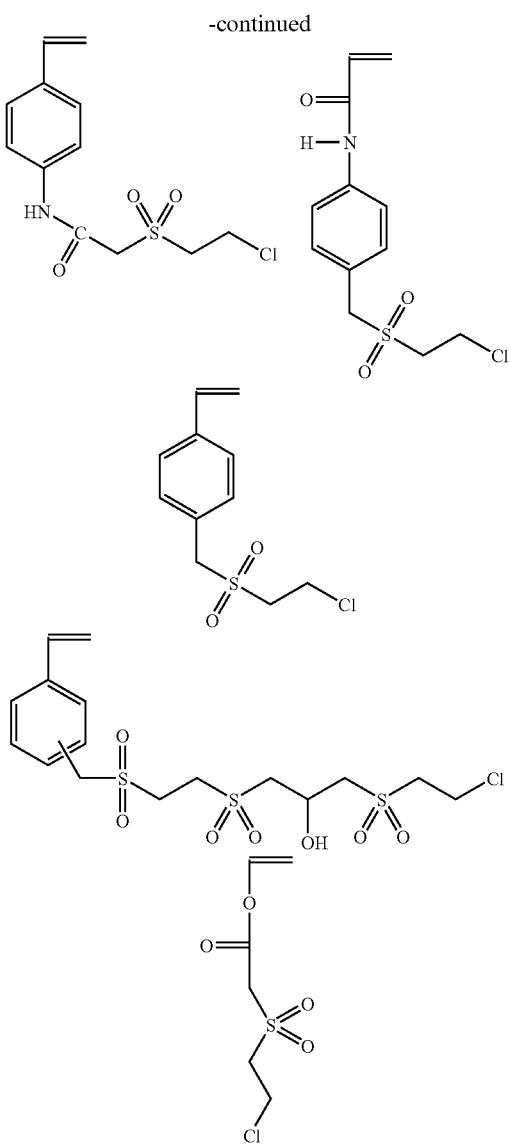

Vinylsulfonyl-functionalized polymers represented by the structure in Formula I, consist of the polymerization products of a "G" monomer, which affords to polymer with favorable solubility and/or physical properties, and a "H" monomer, which contains the vinylsulfone moiety or, more preferably, a vinylsulfone precursor function, such as a sulfonylethyl group with a leaving group in the β-position. More than one type each of G and H monomers may be present in the same polymer. Additional monomers may be incorporated in order to modify properties such as glass transition temperature, surface properties, and compatibility with other formulation components as needed for specific applications. Selection of additional monomers will be application dependent and will be obvious to one skilled in the art.

The particles of the present invention may also comprise a biological capture agent, also referred to as a tag or a bioaffinity tag, which is covalently bound to the particle. As used herein, bioaffinity tag, means a molecule or a complex of molecules that can bind to a biological analyte molecule with high affinity and high specificity, wherein analyte refers to a molecule, such as a polypeptide, polynucleotides, polysaccharides, or other metabolites with biological significance, whose presence, amount, and/or identity are to be determined. Typically it is desirable to have an affinity binding constant between a bioaffinity tag and target analyte greater than $10^6$ $M^{-1}$. Preferably the tag is bound to the particle's stabilizer polymer via direct reaction with the vinylsulfonyl groups of the stabilizer polymer. Examples of bioaffinity tags include, but are not limited to, oligonucleotides, DNA and DNA fragments, peptide nucleic acid (PNA), peptides, antibodies, enzymes, proteins, and synthetic molecules having biological activities.

Nucleic acids are biological molecules that carry genetic information. There are two basic kinds of nucleic acids, deoxyribonucleic acid (DNA) and ribonucleic acid (RNA). A DNA molecule consists of four nucleotide bases, adenine (A), thymine (T), guanine (G), and cytosine (C), which are connected in linear manner covalently; and a RNA molecule consists of four bases, A, uracil (U), G, and C, which are connected in linear manner covalently. The interaction among four bases follows the "Watson-Crick" base pairing rule of A to T (U) and G to C mediated by hydrogen bonds. When two single strand DNA molecules having a perfect "Watson-Crick" base paring match, they are referred as a complementary strand. The interaction between two complementary strands is termed hybridization. As such, a single-stranded DNA or RNA may be used as a bioaffinity tag to interact with its complementary strand. Sometimes, the complementary strand may contain one or more base-pairing mismatches as well.

Commonly used nucleic acid bioaffinity tags, which may used in the invention, may include DNA and DNA fragments, RNA and RNA fragments, synthetic oligonucleotides, and peptide nucleic acids. In another embodiment of the invention, the nucleic acid bioaffinity tags may be any protein scaffold or synthetic molecular moiety capable of recognizing a specific DNA sequence. A nucleic acid bioaffinity tag may be terminally modified to contain one or more than one chemical functional groups that may be used to attach another molecule or surface. Some commonly used terminal modifiers include, but are not limited to, amino, thiol, carboxyl, biotin, and digoxigenin.

A protein molecule consists of 20 amino acids that are connected in linear manner covalently. Some proteins may be further modified at selected amino acids through post-translational processes that include phosphorylation and glycosylation. A protein molecule may be used as a bioaffinity tag.

There are several classes of molecules that may be used as protein bioaffinity tags. Antibodies are a class of naturally occurring protein molecules that are capable of binding targets with high affinity and specificity. The properties and protocols of using antibody can be found in "Using Antibodies; A Laboratory Manual", (Cold Spring Harbor Laboratory Press, by Ed Harlow and David Lane, Cold Spring Harbor, N.Y. 1999). Antigens may also be used as protein bioaffinity tags, if antibodies are intended targets for detection. Protein scaffolds such as whole protein/enzyme or their fragments may be used as protein bioaffinity tags as well. Examples include phosphatases, kinases, proteases, oxidases, hydrolyases, cytokines, or synthetic peptides. Nucleic acid ligands may be used as protein bioaffinity tag molecules after in vitro selection and enrichment for their binding affinity and specificity to certain targets. The principle of such selection process can be found in *Science*, Vol. 249, 505–510, 1990 and *Nature*, Vol. 346, 818–822, 1990. U.S. Pat. No. 5,110,833 discloses an alternative class of synthetic molecules that can mimic antibody binding affinity and specificity and can be readily prepared by the so called Molecular Imprinting Polymer (MIP) which is a synthetic polymer matrix with high affinity binding toward specifically chosen analytes. This technology has been reviewed in *Chem. Rev.* Vol. 100, 2495–2504, 2000.

These polymer particles are also useful in bioanalytical systems such as protein and nucleic acid microarrays, immobilized biological reagents, such as enzymes, and agglutination reagents.

The polymer beads of this invention may be prepared using a variety of heterogeneous polymerization methods, which will be apparent to one skilled in the art. These methods include, but are not necessarily limited to Ugelstad-type swelling methods, suspension polymerization, limited coalescence methods, and dispersion polymerization.

Ugelstad swelling methods are described in *Advances in Colloid and Interface Science* 1979, 13, 101–140 and in *Makromol. Chem* 1979, 180, 737–744 and are incorporated herein by reference. In this method, monodisperse seed particles are swelled by one or more monomers and a polymerization initiator. Polymerization is then initiated. Due to the fact that the seed particles may absorb more than 100 times their original volume of low molecular weight monomers, this method is particularly useful for the preparation of monodisperse particles of the size range useful for this invention.

"Suspension polymerization" refers to a process in which a polymerizable liquid is dispersed as droplets in a continuous aqueous medium and polymerized under continuous agitation. Any of the initiators described below may be used in suspension, and miniemulsion/microsuspension polymerizations. Preferably, organic-soluble initiators will be used. Normally, this process is carried out in the presence of a "granulating agent", such as a lyophilic polymer (starch, natural gums, polyvinyl alcohol or the like) or an insoluble fine powder such as calcium phosphate. These granulating agents help to obtain a dispersion of droplets of the polymerizable liquid but do not provide sufficient stabilization of the dispersion so that the dispersed droplets are stable in the absence of agitation. Therefore, in this method, it is desirable to carry out the polymerization under continuous high-energy mechanical agitation, since extensive coalescence of the droplets may occur, with separation of a bulk phase of the water immiscible, polymerizable material or the formation of large amounts of coagulum. Because this process depends on the details of the shear field in the reactor, and on the changing viscosity of the polymerizing dispersed phase, it is difficult to control reproducibly, is not readily scalable, and gives broad particle size distributions (PSDs). Using a well-designed and well-controlled process, however, it may be possible to obtain particle size distributions sufficient for the purposes of this invention. Suspension polymerization is further described in *Colloid Polym. Sci.* 270: 717–732 (1992), *JMS-Rev. Macromol Chem. Phys.* C31 (2–3): 215 (1991), and in U.S. Pat. Nos. 5,889,285, 5,274,057, 4,601,968, 4,592,990.

"Limited coalescence" refers to a specific type of suspension polymerization in which much narrower particle size distributions may be obtained than in conventional suspension polymerization. This method employs a solid colloidal stabilizer to control both particle size and particle size distribution. Examples of this type of process are described in U.S. Pat. Nos. 2,932,629, 5,133,992, and 4,148,741, which pertain to a suspension polymerization process where a solid colloidal stabilizer such as silica is used to limit the coalescence of droplets containing polymerizable monomer in an aqueous medium. In that process, a water-immiscible polymerizable liquid is sheared to form small droplets suspended in aqueous medium containing a water-dispersible water-insoluble solid colloid such as silica as the suspension stabilizer. The concentration and size of the colloid determines the size of the droplets. The colloid performs this function by adhering to the droplets at the water/monomer interface to form a layer on the surface of the droplets. After monomer droplets have coalesced with other droplets and have grown to a particular diameter, the presence of the layer of colloidal stabilizer particles on the surface of the droplets prevents them from further coalescing and increasing in diameter. In this way, all of the droplets tend to grow to approximately the same diameter, so that, upon polymerization, the resulting polymer particles have a narrow size distribution. This technique is particularly useful for preparing polymer beads of the size range, which are useful for this invention.

Furthermore, other less common techniques exist, which are useful for preparing monodisperse polymer microspheres with sizes on the order of a few microns to tens of microns. A monomer mixture may be emulsified by forcing the mixture through porous glass, as described in *J. Appl. Polym. Sci.* 1994, 51, 1–11, followed by initiation of polymerization to form polymer microspheres. Similarly, monodisperse monomer droplets may be formed by ejection through an acoustic head, as described in *Journal of Controlled Release* 2001, 73, 59–74, and similarly polymerized. In addition both of these emulsification methods may be utilized with solutions of polymers and solid microparticles may be formed by a subsequent solvent evaporation step, as described in *Colloids and Surfaces, A: Physicochemical and Engineering Aspects* 1999, 153, 383–394. Soluble polymers may be grafted to microparticles formed by these methods.

The present invention also includes a method of preparing monodisperse polymer particles comprising preparing a homogeneous solution of at least one ethylenically unsaturated polymerizable monomer, an initiator, and a polymeric stabilizer, wherein the polymeric stabilizer consists of repetitive units of at least one latent vinylsulfonyl moiety, polymerizing the homogeneous solution, and converting the latent vinylsulfonyl moiety or moieties to vinylsulfonyl moieties.

The affixing of the vinylsulfonyl-functionalized polymer to the surface of the polymer beads may be achieved using any chemical agent or technique that is known to result in the formation of a covalent bond between the reactive units of the polymer and the surface of the bead. One such method involves the use of a cerium (IV) compound as described in U.S. Pat. No. 5,527,618 and in *Macromolecules* 1999, 32, 565–573. Alternately, monomers containing chemical units known to react with vinylsulfonyl moieties (such as primary amines, tertiary amines and thiols) may be incorporated within the beads to serve as attachment points. The vinylsulfonyl-containing polymer may then be reacted with these units within the beads resulting in covalent grafting. Polymers containing latent vinylsulfonyl units may also be modified with ethylenic unsaturation and thus may be used as macromonomers, which will result in relatively high efficiencies of grafting. Alternately, the polymerization reaction may simply be carried out in the presence of the vinylsulfonyl-containing polymer. This method by itself will often result in free radical grafting of the soluble polymer to the surface of the bead via the ethylenic unsaturation inherent in the vinylsulfonyl moiety.

In a preferred embodiment, the polymeric stabilizer is soluble in the polymerization solvent and consists of repetitive units, at least one of which contains a vinylsulfonyl moiety, most preferably a latent vinylsulfonyl moiety. The solvent is chosen such that the reactants are soluble but the product polymer is insoluble. In one preferred embodiment, the homogeneous solution is polymerized by heating to the appropriate temperature for addition polymerization. In another preferred embodiment, the latent vinylsulfonyl moieties may be converted to vinylsulfonyl moieties by reaction with base.

The solvent utilized may be any suitable solvent or mixture of solvents that will dissolve the ethylenically unsaturated monomer, vinylsulfonyl-functionalized polymer and initiator but in which the polymer bead is insoluble. The solvents useful in the present invention are preferably liquids at or below room temperature. These solvents may include water, methanol, ethanol, n-propanol, isopropanol, acetone, glycol ethers such as 2-methoxyethanol, acetonitrile, chloromethane, dichloromethane, ethyl acetate, n-propyl acetate, isopropyl acetate, methyl ethyl ketone (MEK), toluene, xylene, cyclohexanone, 2-nitropropane, and methylene chloride, benzene, butyl acetate, chloroform, isopropyl ether, hexane, heptane, octane, petroleum ethers, cyclohexanol, butanol. A mixture of two or more of any of the above solvents may also be used. Preferably the solvent will be water, methanol, ethanol, acetonitrile, glycol ethers, acetone, tetrahydrofuran, methyl ethyl ketone, or a combination thereof.

Any of the common water-soluble or organic-soluble free radical polymerization initiators known in the art of addition polymerization may be used for this invention. These include, but are not restricted to, azo compounds, such as 2,2'-azobis(4-methoxy-2,4-dimethylvaleronitrile), (1-phenylethyl)azodiphenylmethane, 2-2'-azoisobutyronitrile (AIBN), 1,1'-azobis(1-cyclohexanedicarbonitrile), 4,4'-azobis(4-cyanopentanoic acid), and 2,2'-azobis(2-amidinopropane)dihydrochloride, organic peroxides, organic hydroperoxides, peresters, and peracids such as benzoyl peroxide, lauryl peroxide, capryl peroxide, acetyl peroxide, t-butyl hydroperoxide, t-butyl perbenzoate, cumyl hydroperoxide, peracetic acid, 2,5-dimethyl-2,5-di(peroxybenzoate), and p-chlorobenzoyl peroxide, persulfate salts such as potassium, sodium and ammonium persulfate, disulfides, tetrazenes, and redox initiator systems such as $H_2O_2/Fe^{2+}$, persulfate/bisulfite, oxalic acid/$Mn^{3+}$, thiourea/$Fe^{3+}$, $H_2O_2$/ascorbic acid and benzoyl perozide/dimethylaniline. Azo compounds, organic peroxides and organic hydroperoxides are preferred.

The polymerization may be initiated by heating of the reaction mixture to a temperature range where the temperature is matched to the initiator used, that is, a temperature at which said initiator initiates polymerization. Preferably, the temperature range is from 35° C. to 85° C. Alternately, one component of a two component redox initiator system may be added to initiate the polymerization. Such systems can often initiate polymerization at temperatures of room temperature and above. Alternately, photochemical initiation may be used.

The polymer particles may be isolated and purified by a variety of methods. If a water-miscible solvent or solvent mixture is used, aqueous dialysis, diafiltration, or ultrafiltration may be used to replace the carrier fluid in which the latex particles are dispersed with water and remove any low molecular weight impurities. The water-immiscible organic solvent may be removed by rotary evaporation, azeotropic evaporation, low pressure distillation (LPD) or by boiling optionally under a stream of an inert gas such as nitrogen. Certain solvents, which form an azeotrope with water, such as toluene, can be easily removed by simple distillation. Alternately, the water-immiscible organic solvent may be removed by pouring the particle dispersion into a water-miscible organic solvent and retrieving the particles by filtration or sedimentation. A preferred method is repeated cycles of centrifugation, decantation of the supernatant, and redispersion into a desired solvent. The product polymer particles, having excellent colloidal stability, may be stored as an aqueous dispersion or freeze dried to yield a solid powder which will easily redisperse in water.

EXAMPLES

The following examples are provided to illustrate the invention.

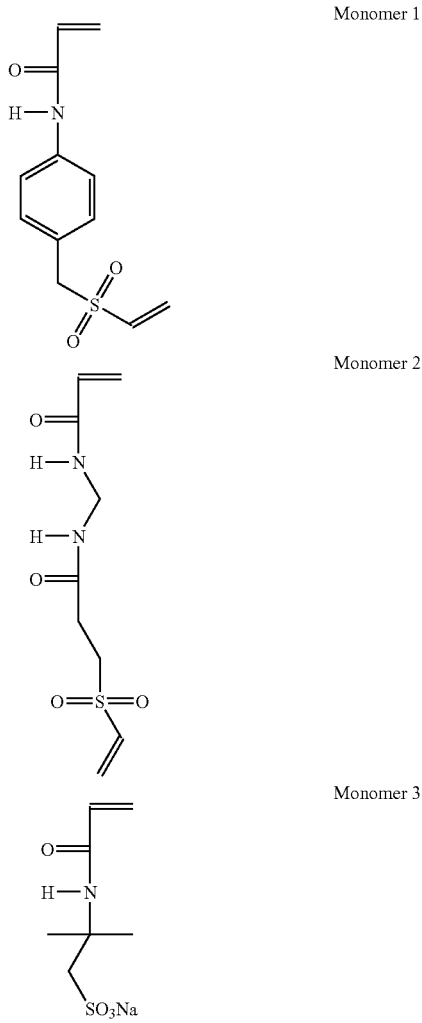

Monomer 1

Monomer 2

Monomer 3

Synthesis of Stabilizing Polymer 1

(44.3:55.7 copolymer of Monomer 1 and Monomer 3)

A chloroethanesulfone-containing stabilizing polymer was synthesized as follows: N-[4-[[(2-chloroethyl)sulfone]methyl]phenyl]acrylamide (22.5 g), sodium 2-acrylamido-2-methanepropionate (34.5 g of a 52.2% weight percent (w/w) solution in water), and 4,4'-azobis(cyanovaleric acid) (0.76 g) were dissolved in 95.0 g N-methyl pyrrolidinone in a 500 mL 3-neck round bottom flask outfitted with a mechanical stirrer, condenser, and nitrogen inlet. The solution was bubble degassed with nitrogen for 10 minutes and heated for 16 hours at 65° C. The resulting solution was precipitated into 3 L propyl acetate to produce a white, sticky semisolid from which the solvents were decanted. The crude product was redissolved in 300 ml methanol and precipitated again into 3 L isopropyl ether. The resulting tacky solid was isolated by decanting the solvents and was dried in a vacuum oven at 80° C. for 48 hours to afford 42.5 g of a white powder. The chloroethylsulfone content of the polymer was determined to be 1.732 mEq/g by titration with sodium hydroxide (NaOH), which is equivalent to a polymer 44.3 mol % monomer 1. Size exclusion chromatography (SEC) of the polymer in hexafluoroisopropanol gave absolute molecular weights of Mn=33,800 and Mw=96,300.

Synthesis of Stabilizing Polymer 2

(45.5:54.5 copolymer of Monomer 1 and Monomer 3)

A chloroethanesulfone-containing stabilizing polymer was synthesized as follows: N-[4-[[(2-chloroethyl)sulfone]methyl]phenyl]acrylamide (22.5 g), sodium 2-acrylamido-2-methanepropionate (34.5 g of a 52.2% w/w solution in water), and 4,4'-azobis(cyanovaleric acid) (0.76 g) were dissolved in 160.0 g N-methyl pyrrolidinone in a 1 L 3-neck round bottom flask outfitted with a mechanical stirrer, condenser, and nitrogen inlet. The solution was bubble degassed with nitrogen for 10 minutes and heated for 16 hours at 65° C. The resulting solution was precipitated into 3 L propyl acetate to produce a fine powder which was recovered by filtration. The crude product was redissolved in 300 ml methanol and precipitated again into 3 L isopropyl ether. The resulting powder was collected by filtration and dried in a vacuum oven at 80° C. for 48 hours to afford 38.6 g of a white powder. The chloroethylsulfone content of the polymer was determined to be 1.776 mEq/g by titration with NaOH, which is equivalent to a polymer 45.5 mol % monomer 1. Size exclusion chromatography (SEC) of the polymer in hexafluoroisopropanol gave absolute molecular weights of Mn=12,800 and Mw=36,500.

Synthesis of Stabilizing Polymer 3

(33.4:66.6 copolymer of Monomer 2 and Monomer 3)

A chloroethanesulfone-containing stabilizing polymer was synthesized as follows: N-[3-(2-chloroethylsulfone)propanamidomethyl]acrylamide (18.0 g) was dissolved in 210 mL N-methyl pyrrolidinone, filtered to remove a small amount of insoluble gels, and bubble degassed for 10 minutes with nitrogen. A second solution of sodium 2-acrylamido-2-methanepropionate (40.7 g of a 52.2% w/w solution in water), isopropanol (50 mL), deionized water (50 mL), dodecanethiol (0.4 mL) and 4,4'-azobis(cyanovaleric acid) (0.72 g) was prepared and similarly bubble degassed. The two solutions were combined in a 1 L round bottom and sealed with a rubber septum fastened with a plastic strap tie. After heating for 16 hours at 65° C., the low boiling solvents were stripped using a rotary evaporator and the remaining solution was precipitated into 3 L isopropyl ether to afford a thick semisolid from which the solvents were decanted. The product was redissolved in 250 ml 250 mL methanol and again precipitated into 3 L isopropyl ether. A fine powder was recovered by filtration and dried in a vacuum oven at 70° C. for 48 hours to afford 34.56 g of a white powder. The chloroethylsulfone content of the polymer was determined to be 1.35 mEq/g by titration with NaOH which is equivalent to a polymer 33.39 mol % monomer 1. Size exclusion chromatography (SEC) of the polymer hexafluoroisopropanol gave absolute molecular weights of Mn=10,900 and Mw=26,000.

Synthesis of Stabilizing Polymer 4

(47.4:52.6 copolymer of Monomer 1 and Monomer 3)

A chloroethanesulfone-containing stabilizing polymer was synthesized as follows: N-[4-[[(2-chloroethyl)sulfone]methyl]phenyl]acrylamide (27.00 g), sodium 2-acrylamido-2-methanepropionate (26.00 g of a 52.2% w/w solution in water), and 4,4'-azobis(cyanovaleric acid) (0.76 g) were dissolved in 260 g N-methyl pyrrolidinone in a 1 L mL 3-neck round bottom flask outfitted with a mechanical stirrer, condenser, and nitrogen inlet. The solution was bubble degassed with nitrogen for 10 minutes and heated for 4 hours at 65° C. The resulting solution was precipitated into 3 L 1:1 acetone: ethyl acetate to produce a hygroscopic, fine white powder, which was isolated by filtration. The crude product was redissolved in 200 ml methanol and precipitated again into 3 L isopropyl ether. The resulting coarse precipitate was isolated by filtration and was dried in a vacuum oven at 70° C. for 24 hours to afford 26.59 g of a white powder. The chloroethylsulfone content of the polymer was determined to be 1.840 mEq/g by titration with NaOH which is equivalent to a polymer 47.4 mol % monomer 1. Size exclusion chromatography (SEC) of the polymer in hexafluoroisopropanol gave absolute molecular weights of Mn=5,720 and Mw=17,700.

Example 1

Synthesis of Polymer Particle 1

Polymer 1 (3.50 g) was dissolved in methanol (200.00 g) in a 500 ml three neck round bottom flask with a reflux condenser, nitrogen inlet, and mechanical stirrer. The solution was bubble degassed with nitrogen for 20 minutes and the reaction vessel was placed in a thermostatted water bath at 52° C. A similarly degassed solution of 2,2'-azobis(2,4-dimethylvaleronitrile) (0.20 g) in styrene (25.00 g, passed over basic alumina) was added all at once and the reaction was allowed to stir at 250 RPM overnight (about 16 hours). After about 20 minutes, the reaction became a translucent blue. The crude, white product latex was purified by three cycles of centrifugation, decantation of the clear supernatant, and redispersion in methanol. The final redispersion step used deionized water. 78.67 g of a 28.63% solids dispersion were obtained. The mean particle size was determined by the Coulter counter method, indicating a Coulter counter mean diameter of 1.40 μm and a coefficient of variation (CV) of 15.13%.

The loading of chloroethylsulfonyl functionalities was determined by a titrimetric procedure. An aliquot of the bead dispersion was added to a known quantity of aqueous NaOH, allowed to react for 30 minutes at room temperature, and back titrated with HCl ($4.2 \times 10^{-3}$ meq vinylsulfone/g solid beads).

To convert the chloroethylsulfone units of the particle to vinylsulfone units, 54.79 g of the particle dispersion was added 0.21 g 1.00 N NaOH. After 30 minutes, the pH had stabilized at 7.

Example 2

Synthesis of Polymer Particle 2

An identical procedure as that used for Polymer Particle 1 was followed using the following reagents: methanol (180 g), deionized water (20.0 g), Polymer 1 (3.50 g), methyl methacrylate (25.00 g, passed over basic alumina), and 2,2'-azobis(2,4-dimethylvaleronitrile) (0.20 g). 86.00 g of a particle dispersion of 18.51% solids was recovered. HCl back titration: ($4.0 \times 10^{-3}$ meq vinylsulfone/g solid beads). A Coulter counter mean diameter of 3.12 μm and a Coefficient of variation (CV) of 5.74% were obtained.

Example 3

Synthesis of Polymer Particle 3

An identical procedure as that used for Polymer Particle1 was followed using the following reagents: methanol (180 g), deionized water (20.0 g), Polymer 1 (3.50 g), styrene (25.00 g, passed over basic alumina), and 2,2'-azobis(2,4-dimethylvaleronitrile) (0.20 g). 86.00 g of a particle dispersion of 18.51% solids was recovered. The loading of chloroethylsulfonyl units was determined by the HCl back titration method described above ($1.1 \times 10^{-2}$ meq vinylsulfone/g solid beads). The mean particle diameter was determined by the Mie scattering method using a Horiba LA-920 instrument, providing a mean diameter of 0.4271 μm and a Coefficient of variation (CV) of 13.60%.

Example 4

Synthesis of Polymer Particle 4

An identical procedure as that used for Polymer Particle 1 was followed using the following reagents: methanol (90 g), deionized water (10.0 g), Polymer 1 (1.75 g), styrene (12.50 g, passed over basic alumina), and 2,2'-azobis(2,4-dimethylvaleronitrile) (0.10 g). 55.60 g of a particle dispersion of 12.60% solids was recovered. The loading of chloroethylsulfonyl units was determined by the HCl back titration method described above ($1.1 \times 10^{-2}$ meq vinylsulfone/g solid beads). The mean particle diameter was determined by the Mie scattering method using a Horiba LA-920 instrument to provide a mean diameter of 0.4910 μm and a Coefficient of variation (CV) of 12.42%.

Example 5

Tagging of Polymer Particle 1

10 μL of vinylsulfone-modified particles 1 were rinsed twice with 1 ml of 0.1 M sodium phosphate buffer pH 7.0. The particles were resuspended in 2 mg/mL of goat anti-mouse IgG in 0.1 M sodium phosphate buffer pH 7.0. The reaction was allowed to proceed for 1 hour at room temperature. The antibody modified particles were washed twice with 1 mL of 0.1 M sodium phosphate buffer pH 7.0. The antibody modified particles were subjected to particle size measurement using a Horiba LA-920 instrument. The mean particle diameter of polymer particles 1 after functionalization with antibody is 4.56 μm indicating some agglomeration of the primary particles after functionalization with the goat anti-mouse IgG.

Example 6

Use of Tagged Particle 1 in Agglutination Assay

To a solution of 500 μL of particles 1 functionalized with goat anti-mouse IgG, Mouse IgG solution was added to a final concentration of 0.05 mg/mL. The mixture was incubated at room temperature for 10 minutes and the particles size was determined using a Horiba LA-920 instrument. The mean particle diameter of goat anti-mouse IgG functionalized particle after reaction with antigen is 6.48 μm indicating a positive agglutination assay result.

The invention has been described in detail with particular reference to certain preferred embodiments thereof, but it will be understood that variations and modifications can be effected within the spirit and scope of the invention.

What is claimed is:

1. A particle composition comprising monodisperse polymer beads stabilized by vinylsulfonyl-functionalized polymers, wherein said vinylsulfonyl-functionalized polymers are grafted to the external surfaces of said beads and, wherein said vinylsulfonyl-functionalized polymer is soluble in water, water-miscible solvents, or a mixture thereof, wherein said vinylsulfonyl-functionalized polymer comprises vinylsulfonyl or vinylsulfonyl precursor moieties grafted to the surface of said polymer bead, wherein said vinylsulfonyl-functionalized polymers are represented by Formula I:

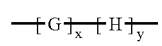

Formula I wherein
"G" represents a polymerized α,β-ethylenically unsaturated addition polymerizeable monomer;
"H" represents a vinylsulfone or vinylsulfone precursor unit monomer; and
x and y both represent molar percentages ranging from 10 to 90 and 90 to 10.

2. The composition of claim 1 wherein said monodisperse polymer particles comprise a coefficient of variation in the particle diameter of less than 20%.

3. The composition of claim 1 wherein said monodisperse polymer particles comprise a coefficient of variation in the particle diameter of less than 15%.

4. The composition of claim 1 wherein said monodisperse polymer particles comprise a coefficient of variation in the particle diameter of less than 10%.

5. The composition of claim 1 wherein said polymer bead comprises a polymer made from at least one monomer containing α,β-ethylenic unsaturation.

6. The composition of claim 1 wherein polymer bead comprises a polymer made from at least one monomer comprising a monomer having limited solubility in water and wherein said polymer bead further comprises less than 10% of the total weight of the polymerizeable solids, of one or more water-soluble ethylenically unsaturated monomers.

7. The composition of claim 1 wherein G represents nonionic or ionic monomers.

8. The composition of claim 1 wherein G represents the polymerized form of acrylamide, sodium 2-acrylamido-2-methanepropionate, sulfopropyl acrylate and methacrylate salts, or sodium styrenesulfonate.

9. The composition of claim 1 wherein H represents the polymerized form of a vinylsulfone or vinylsulfone precursor unit.

10. The composition of claim 1 wherein said "H" represents groups represented by Formula II:

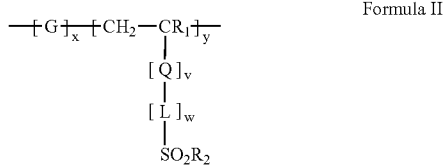

Formula II wherein:

$R_1$ is a hydrogen atom or a $C_1$–$C_6$ alkyl group;

Q is —$CO_2$—, or $CONR_1$;

v is 1 or 0;

w is 1–3;

L is a divalent linking group containing at least one linkage selected from the group consisting of —$CO_2$— and —$CONR_1$, and containing 3–15 carbon atoms, or a divalent atom containing at least one linkage selected from the group consisting of —O—, —$N(R_1)$—, —CO—, —SO—, —$SO_2$—, —$SO_3$—, —$SO_2N(R_1)$—, —$N(R_1)CON(R_1)$— and —$N(R_1)CO_2$—, and containing 1–12 carbon atoms in which $R_1$ has the same meaning as defined above; and $R_2$ is —CH=CH2 or —CH2—CH2$X_1$ wherein $X_1$ is a substituent replaceable by a nucleophilic group or releasable in the form of $HX_1$ by a base.

11. The composition of claim 10 wherein $X_1$ represents —$S_2O_3^-$, —$SO_4^-$, —Cl, —Br, —I, quaternary ammonium, pyridinium, and —CN, and sulfonate esters.

12. The composition of claim 1 wherein further comprising a bioaffinity tag bound to the surface of said bead.

13. The composition of claim 12 wherein said bioaffinity tag comprises at least one member selected from the group consisting of nucleic acids, antibodies, proteins, polysaccharides. oligonucleotides, peptide nucleic acid (PNA), peptides, antibodies, antigens, enzymes, proteins, and synthetic molecules having biological activities.

* * * * *

UNITED STATES PATENT AND TRADEMARK OFFICE
CERTIFICATE OF CORRECTION

| | | |
|---|---|---|
| PATENT NO. | : 7,163,998 B2 | Page 1 of 1 |
| APPLICATION NO. | : 10/658009 | |
| DATED | : January 16, 2007 | |
| INVENTOR(S) | : Jeffrey W. Leon et al. | |

It is certified that error appears in the above-identified patent and that said Letters Patent is hereby corrected as shown below:

Column 18, Line 7  In Claim 10, delete "CH2 or –CH2–CH2X1" and insert -- $CH_2$ or $-CH_2-CH_2X_1$ --, therefor.

Column 18, Lines 18-19  In Claim 13, delete "polysaccharides." and insert -- polysaccharides, --, therefor.

Signed and Sealed this

Twentieth Day of May, 2008

JON W. DUDAS
*Director of the United States Patent and Trademark Office*